A. K. LOVELL.
SCREW CONSTRUCTION.
APPLICATION FILED JAN. 13, 1914. RENEWED OCT. 6, 1915.
1,181,971.
Patented May 2, 1916.
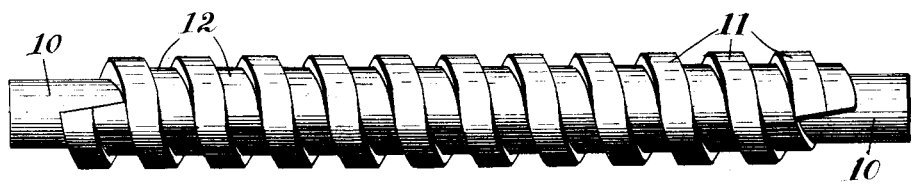
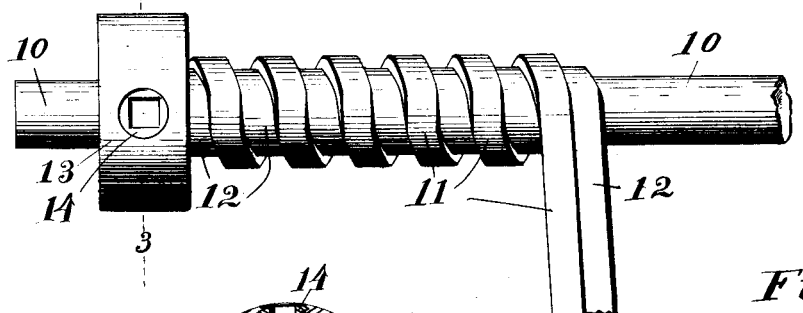
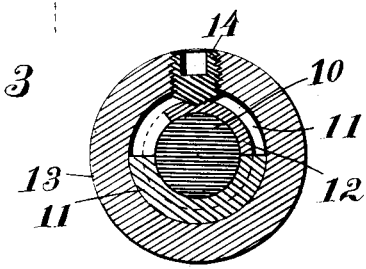
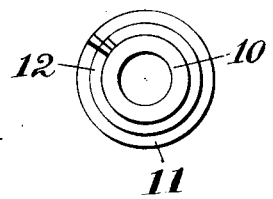
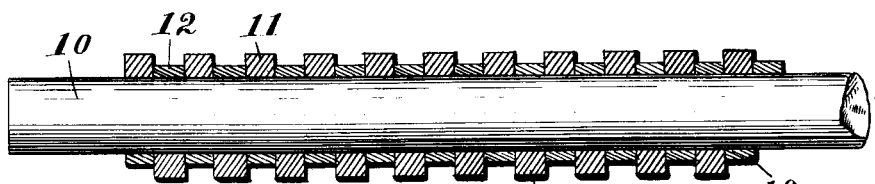
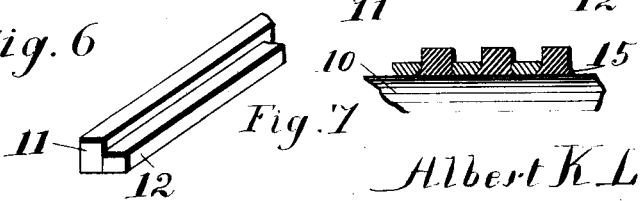
Inventor
Albert K. Lovell
By George L. Barnes
Attorney
Witnesses
G. M. Copenhaver,
H. G. Rueth

UNITED STATES PATENT OFFICE.

ALBERT K. LOVELL, OF NEW HAVEN, CONNECTICUT.

SCREW CONSTRUCTION.

1,181,971.  Specification of Letters Patent.  Patented May 2, 1916.

Application filed January 13, 1914, Serial No. 811,814. Renewed October 6, 1915. Serial No. 54,431.

*To all whom it may concern:*

Be it known that I, ALBERT K. LOVELL, of New Haven, in the county of New Haven and in the State of Connecticut, have invented a certain new and useful Improvement in Screw Construction, and do hereby declare that the following is a full, clear, and exact description thereof.

My invention relates to screw construction and it has for its object to provide a screw with wrapped threads as distinguished from the ordinary integral cut threads heretofore used, whereby the process of manufacture will be simplified and cheapened and waste of material avoided, and the product improved.

The invention consists in the novel screw embodying a thread coiled upon a rod, in combination with an independent spacing and binding strip wound therewith for separating the threads and in the construction of parts as hereinafter more fully described and claimed.

In the accompanying drawings Figure 1 is a side elevation of a screw embodying my improved construction; Fig. 2 is a similar elevation of a screw shown in the process of construction, illustrating the winding of the thread and binding strip; Fig. 3 is a screw section on the line 3—3 of Fig. 2: Fig. 4 is an end view of Fig. 1; Fig. 5 is a central lengthwise section of Fig. 1; Fig. 6 is a view of a thread strip and binder showing the proportion and relation of parts; Fig. 7 is a lengthwise section of a modification.

Referring to the drawings this improved screw is shown to comprise a cylindrical rod, core or tube 10, forming the core or body of the screw, a thread strip 11 coiled spirally around the core and tightly wound upon it, and a locking strip 12 wound around the core in the space between the convolutions of the threads, in intimate contact with the parts. At the ends the thread and the locking strip are firmly attached to the core in some secure manner, which may consist of brazing them thereto, or welding the parts, or securing them together by mechanical means, as for instance by means of a band or collar 13 encircling the thread and locking strip, with a set screw 14 screwed through the collar and tightly clamped upon the end of the locking strip or the screw thread, as described. The cross sectional form of the thread as, shown in the drawings, is rectangular, to provide the square threaded machine screw which is preferred for the application of great power. The binder or locking strip in such case is also rectangular in cross section and its height or radial thickness is less than that of the thread by the amount equal to the required depth of the working face or radial pressure surface of the thread, as particularly shown in Figs. 5 and 6. The circumference of the locking strip comprises the bottom of the space between the threads, and the appearance of the screw when finished is that of the ordinary square thread machine cut screw.

In the manufacture of this screw, the thread strip and the locking strip are preferably wound simultaneously in intimate contact with each other upon the rod or core which forms the body of the screw, as indicated in Fig. 2, which illustrates the process of construction. The thread strip may be provided with lateral flanges 15 at its base, which the locking strip is superimposed upon and encircles, as shown in the modification in Fig. 7, in which construction the locking strip is adapted to bear externally upon and lock the thread circumferentially upon the rod.

Constructed as hereinbefore described, this improved screw may be made of accurate pitch and proportions and of great strength, and at a cost considerably below that of a machine or die cut screw. As an additional element of economy of production, the core may be made of a different kind of material from the thread and locking strip, as for instance a brass screw may be built upon a rod of steel or other material of lesser cost than the thread.

The proportion of equal width of thread and locking strip which is shown in the drawings, may be departed from as desired for various purposes, that shown being the usual construction for high power screws. The form of thread may be varied as required, and with their working surfaces at any desired angle with the axis of the core.

Having thus described my invention what I claim is—

1. A screw comprising in combination a central body or core, a thread strip wrapped around the core and a locking strip wound between the convolutions of the threads.

2. A screw comprising in combination a central body or core, a thread strip wrapped helically around the core, and a locking strip wound between and spacing the convolutions of the threads.

3. A screw comprising in combination a central core or body, a thread strip wrapped spirally around the core in intimate contact therewith, and a locking strip wound and fitted between the convolutions of the threads in intimate contact with the body and with the threads.

4. As an article of manufacture, a screw comprising in combination a cylindrical core or rod, a helical thread strip coiled around the core and secured thereto at its respective ends, and a locking strip fitted and coiled between the convolutions of the threads and having its respective ends secured to the rod with those of the thread.

In testimony that I claim the foregoing I have hereunto set my hand.

ALBERT K. LOVELL.

Witnesses:
JAMES H. MARR,
A. T. HAYES.